(12) United States Patent
Willke, Jr.

(10) Patent No.: US 6,248,146 B1
(45) Date of Patent: Jun. 19, 2001

(54) INDUCTION ASSEMBLY FOR HIGH EFFICIENCY AIR FILTER

(76) Inventor: Herbert L. Willke, Jr., 55 Magazine St., Apt. 18, Cambridge, MA (US) 02139

( * ) Notice: Subject to any disclaimer, the term of this patent is extended or adjusted under 35 U.S.C. 154(b) by 0 days.

(21) Appl. No.: 09/403,398

(22) PCT Filed: Apr. 17, 1998

(86) PCT No.: PCT/US98/07919

§ 371 Date: Oct. 20, 1999

§ 102(e) Date: Oct. 20, 1999

(87) PCT Pub. No.: WO98/14760

PCT Pub. Date: Oct. 29, 1998

Related U.S. Application Data

(60) Provisional application No. 60/044,514, filed on Apr. 21, 1997.

(51) Int. Cl.[7] ................................................. B01D 46/00
(52) U.S. Cl. ........................... 55/338; 55/385.2; 55/418; 55/419; 454/187; 454/188
(58) Field of Search ..................................... 55/338, 385.2, 55/418, 419, 385.1, DIG. 18, DIG. 29; 454/187, 188, 189, 228, 234

(56) References Cited

U.S. PATENT DOCUMENTS

| | | | |
|---|---|---|---|
| 3,688,477 | 9/1972 | Coward, Jr. | 55/418 |
| 4,191,543 | 3/1980 | Peters | 55/279 |
| 4,606,259 | 8/1986 | Nystrom | 98/36 |
| 4,901,764 | 2/1990 | Meline | 137/803 |
| 5,290,331 | 3/1994 | Miles et al. | 55/321 |

*Primary Examiner*—Duane S. Smith
(74) *Attorney, Agent, or Firm*—McDermott Will & Emery

(57) ABSTRACT

An induction assembly (100) for a high efficiency air filter includes a primary intake plenum (102), a primary throat aperture (106), a secondary intake plenum (112), a momentum transfer section (114), a static regain section (116), and a discharge opening (122). The primary intake plenum (102) directs primary air at high pressure to the primary throat aperture (106), which constricts the flow of the primary air and consequently increases the primary air velocity. The primary throat aperture (106) directs the high velocity primary air into the momentum transfer section (114), thus creating a negative pressure region by the Bernoulli principle and drawing a substantially equal quantity of the secondary air into the momentum transfer section (114). After the primary and secondary gasses mix in the momentum transfer section (114), the gas mixture continues on into the static regain section (116). As the gas mixture passes through the static regain section (116), the velocity pressure of the gas mixture is converted into static pressure, which is sufficient to force the gas mixture through a resistance at the discharge opening (122) such as an output filter (126).

12 Claims, 4 Drawing Sheets

*Fig.* 3

INDUCTION ASSEMBLY FOR HIGH EFFICIENCY AIR FILTER

CROSS-REFERENCE TO RELATED APPLICATIONS

The present application is based on provisional application, U.S. Ser. No. 60/044,514, filed on Apr. 21, 1997.

FIELD OF THE INVENTION

This invention relates to high efficiency air filter assemblies, and more particularly, to high efficiency air filter assemblies which utilize a primary, high pressure air source to draw, via induction, air from a secondary low pressure air source.

BACKGROUND OF THE INVENTION

Industrial clean rooms require filtered air at a high flow rate relative to the rates required for ordinary commercial environments. Typically, a clean room will require 100 times the flow rate used in an ordinary commercial space. The air handling units required to deliver this flow rate occupy a substantial fraction of a clean room facility's total space and account for a substantial fraction of the clean room's operating cost. The present invention reduces the required air handling volume, and thus the space occupied by the air handling equipment, by about ½, while reducing the required air handler power consumption by about 25%.

An object of the present invention is to provide a high efficiency air filter assembly which combines two sources of air via induction, thereby delivering substantially twice the primary air flow, against a relatively high pressure load such as a high efficiency filter.

Other objects of the present invention will in part be evident and will in part appear hereinafter. The invention accordingly comprises the process involving the several steps and the relation and order of one or more of such steps with respect to the others and the apparatus possessing the construction, combination of elements, and arrangement of parts exemplified in the following detailed disclosure, and the scope of the application of which will be indicated in the claims.

SUMMARY OF THE INVENTION

The present invention is directed to a system for accepting primary air from an air handling unit, drawing by induction a comparable amount of secondary air from the return plenum in which the device resides, and delivering the total to an integral high efficiency filter at the required flow volume and pressure. The primary air is distributed through a primary air intake plenum to a narrow throat aperture at a sufficiently high velocity so that, by the Bernoulli Effect, a negative pressure is created at the secondary air opening sufficient to draw in the required volume of secondary air. A momentum transfer section accelerates the secondary air while decelerating the primary air, to create a velocity profile suitable for the following static regain section, in which the kinetic energy density of the entering air is largely converted into required static pressure as the velocity is gradually reduced. Finally, the required volume of air is discharged through the high efficiency filter.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENT

Figure 1:
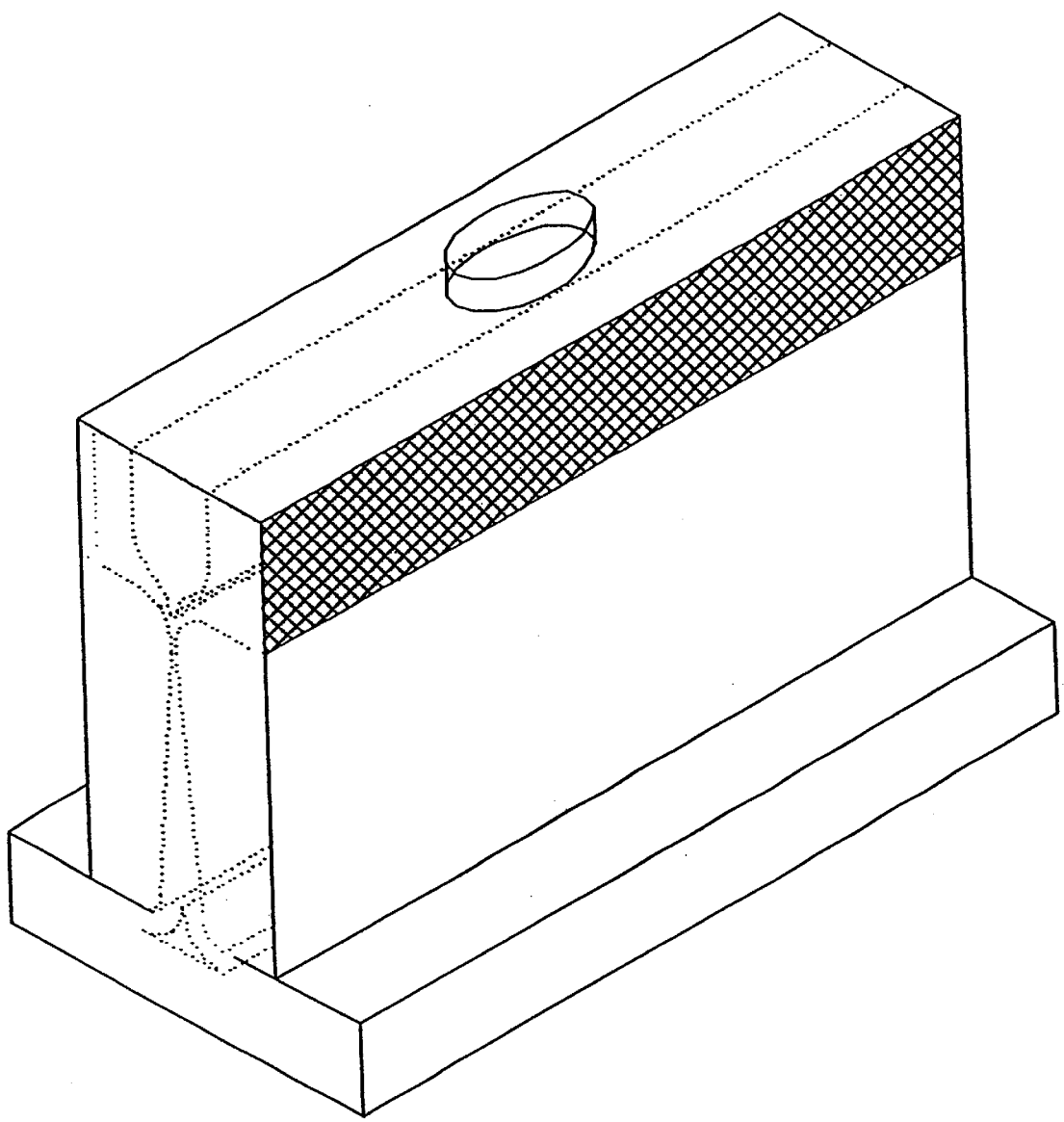
FIG. 1 shows a perspective view of an induction assembly for a high flow air filter according one preferred embodiment of the present invention.
Figure 2:
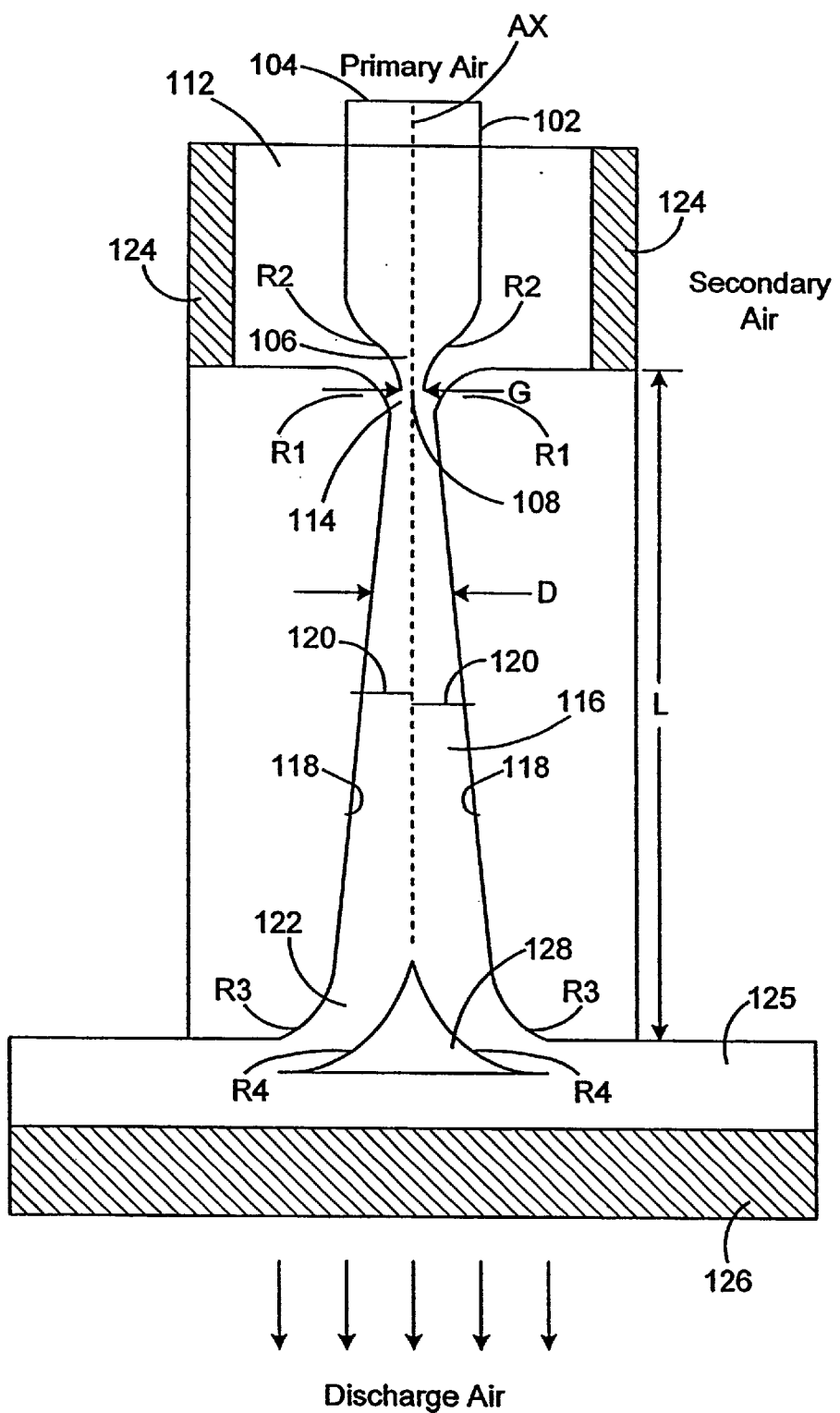
FIG. 2 shows a cross section of the induction assembly if FIG. 1.

The present invention is directed to an induction assembly for a high efficiency air filter. FIG. 1 and FIG. 2 show one preferred embodiment of an induction assembly 100 including a primary intake air plenum 102, for receiving primary air at a first end 104 of the intake plenum 102 and directing the primary air to a primary throat aperture 106 located at a second end 108 of intake plenum 102. The source of primary air may include an air conditioning unit or other air handling unit which can produce a high pressure/high velocity air flow. Although the illustrated embodiment describes an induction assembly which mixes and directs air, it should be understood that the primary source and secondary source may any gas or gas mixture in place of air.

The primary throat aperture 106 includes a narrow, slot approximately 4 feet long and ¼ inch wide, although in other embodiments, the length, shape and width of the slot in the primary throat aperture 106 may be varied so as to adjust the characteristics of the air flow through the primary throat aperture 106. Although in the illustrated embodiment, the primary and secondary source include air, the primary and secondary sources in alternate embodiments may include any gas or mixture of gasses.

The primary throat aperture 106 directs primary air along axis AX into the momentum transfer section 114, which is located at a secondary throat aperture of a secondary air guide 112. The secondary air guide 112 channels secondary air from a secondary air source toward the momentum transfer section 114 at the secondary throat aperture. The static regain section 116 lies further along axis AX and adjacent to the momentum transfer section 114. The interior walls 118 of the static regain section define a regain angle 120 with respect to axis AX. In one preferred embodiment of the invention, the regain angle 120 is approximately 4 degrees, although in other embodiments the angle 120 may include values from 2 to 7 degrees. The effect of a smaller angle 120 is to increase the effect of friction as the air mixture travels along axis AX, and the effect of a larger angle 120 is to increase the probability of a reverse air flow along axis AX. The discharge opening 122 is disposed at the distal end of the static regain section 116 along axis AX.

In alternate embodiments of the invention, secondary air filters 124 are included in the secondary air guide 112 such that secondary air from the secondary air source passes through the secondary air filters 124 prior to reaching the momentum transfer section 114.

The primary air directed along axis AX into the momentum transfer section 114 causes a negative static pressure to develop at the momentum transfer section. The negative static pressure forces the secondary air from the secondary air guide 112 into the momentum transfer section 114, thus mixing the secondary air with the primary air. In one preferred embodiment of the invention, the ratio of primary to secondary air in the mixture produced by the momentum transfer section 114 is 1:1, although the negative static pressure may be adjusted so as to produce other primary to secondary air mixture ratios. The primary/secondary air mixture flows along axis AX within static regain section 116, toward discharge opening 122 and ultimately into the discharge plenum 125. Characteristics of the momentum transfer section 114 (e.g., the size and shape) creates a smooth air velocity profile within the momentum transfer section 114. As the primary/secondary air mixture passes through the momentum transfer section, the high momentum of the primary air is transferred to the secondary air; i.e., the secondary air accelerates while the primary air decelerates, until the overall momentum of the primary/secondary air mixture is substantially homogeneous throughout the mixture.

As the primary/secondary air mixture travels along axis AX within the static regain section 116, the area available to the flow increases due to the regain angle 120. As the available area increases, the velocity of the air mixture decreases, thus transferring the kinetic energy density of the high velocity air which enters the static regain section 116 into the static pressure required at the discharge opening 122 to force the air mixture through an output filter 126. In other words, the air mixture satisfies the Bernoulli principle as it travels along axis AX toward the discharge opening 122 such that the sum of the velocity pressure and the static pressure exerted by the air mixture remains constant, neglecting the effects of friction along the static regain section.

In one preferred embodiment of the invention, the induction assembly 100 receives primary air at a flow rate within a range of 300 to 360 c.f.m. at approximately 1.4 in. w.g., and draws secondary air via induction at approximately –0.1 in. w.g., at a flow rate of approximately 300 to 360 c.f.m. After the air mixture passes through the static regain section 116, the induction assembly 100 discharges the air mixture through a 2 foot by 4 foot ULPA filter at a flow rate in the range of 600 to 720 c.f.m. (i.e., a flow rate approximately equal to the sum of the primary air flow rate and the secondary air flow rate. In the embodiment shown in FIG. 2, the gap G is 0.178 inches, the distance D is 0.54 inches, the radii of curvature R1 and R2 are 2.0 inches, the distance L is 16 inches, the radii of curvature R3 and R4 are 1¹¹⁄₃₂ inches and 2¹¹⁄₁₆ inches, respectively, where R3 and R4 are concentric.

In further embodiments of the invention, a splitter 128 may be included so as to uniformly distribute the air from the discharge opening 122 across the output filter 126. In some embodiments, the splitter 128 may consist of a sound absorbing material so as to reduce the sound associated with altering the path of the air flow.

Figure 3:
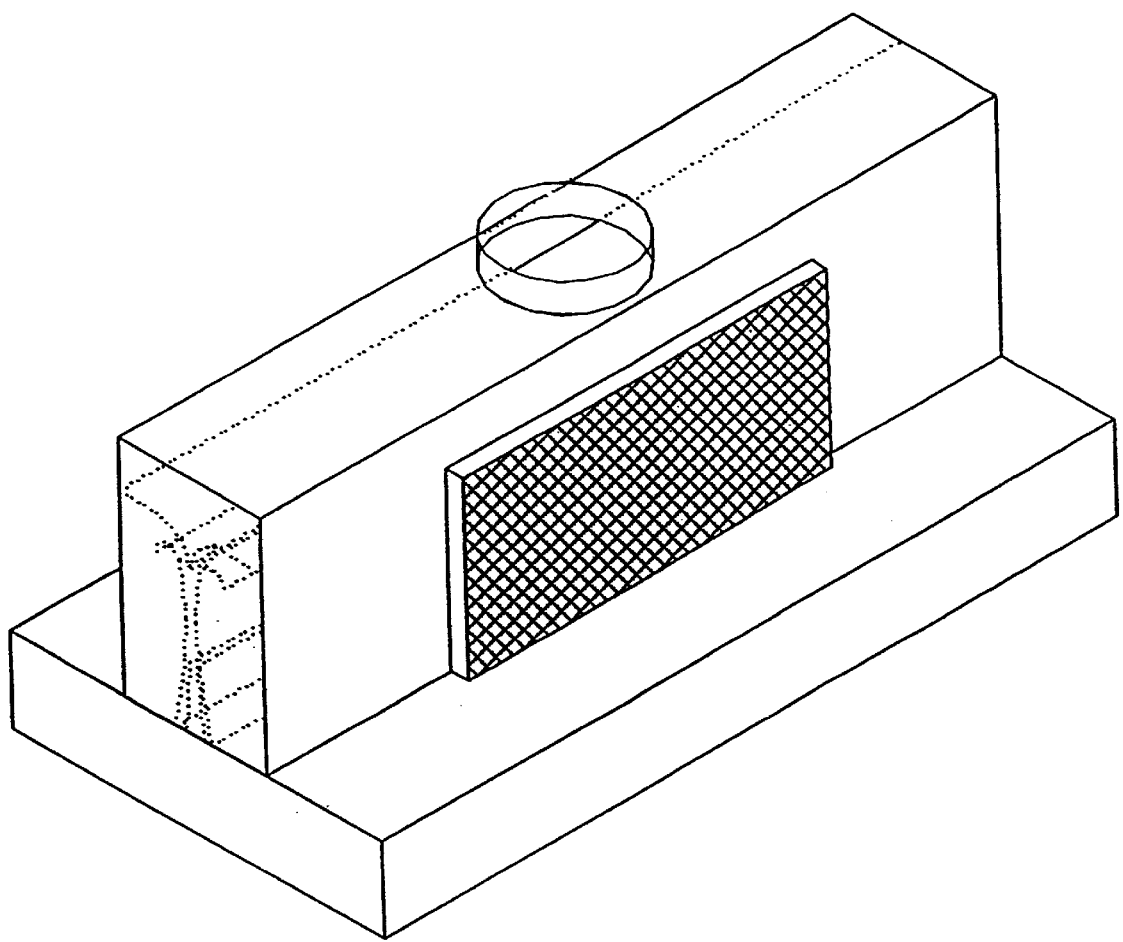
FIG. 3 shows a perspective view of an alternate embodiment of the induction assembly of FIG. 1 in accordance with the present invention; and, FIG. 4 shows a cross section of the induction assembly of FIG. 3.
Figure 4:
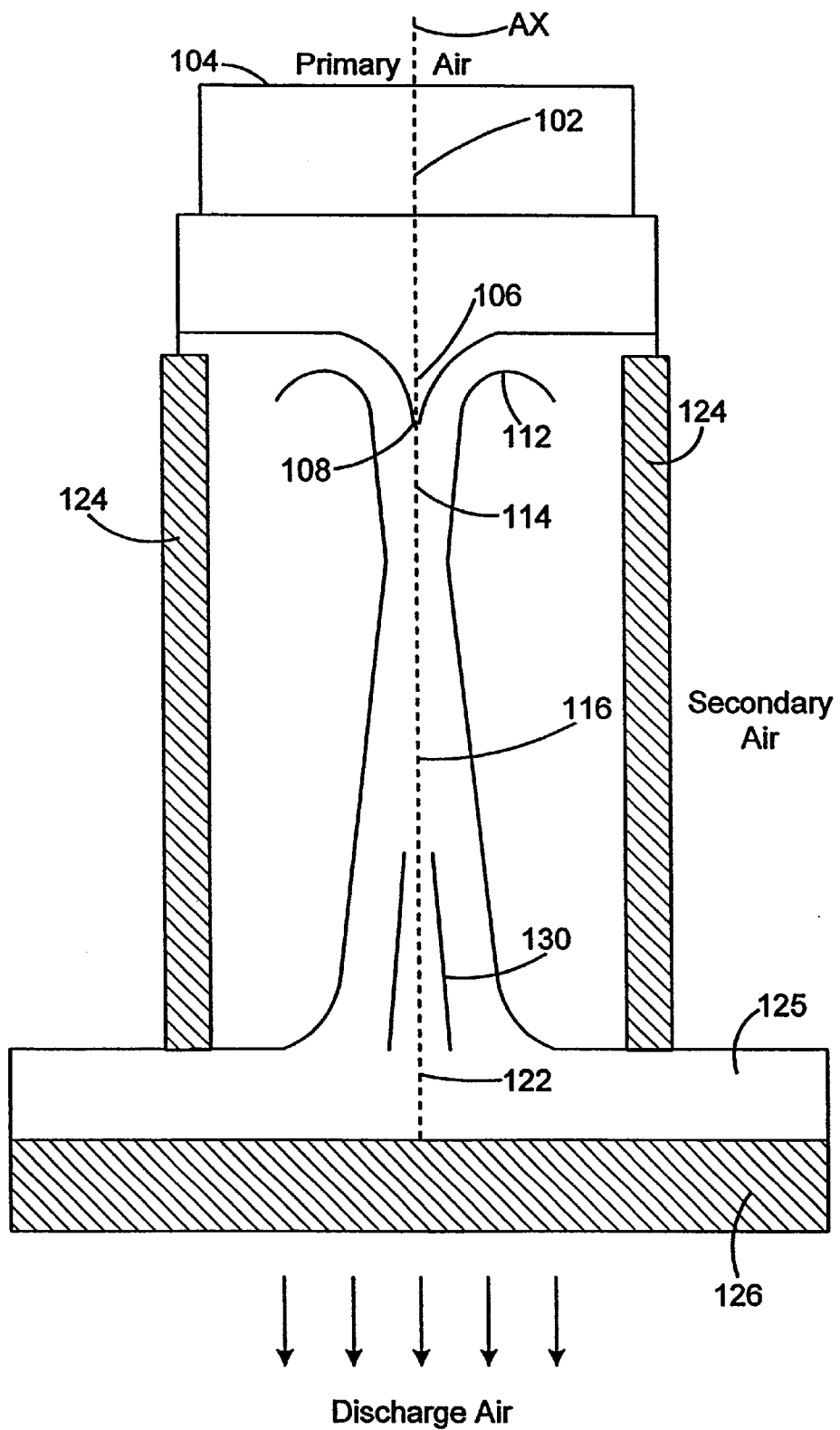

In the embodiment shown in FIGS. 3 and 4, the regain angle does not remain constant along the entire axis AX, but rather changes abruptly approximately halfway between the momentum transfer section 114 and the discharge opening. This "flaring" of the static regain section allows a shorter distance L, but increases the probability of reverse flow along axis AX from the discharge opening toward the momentum transfer section 114. Increasing the pressure of the primary air flow and/or including baffles 130 reduces the reverse flow probability. In general, the embodiment shown in FIGS. 3 and 4 is more compact because the distance L can be shorter than the embodiment shown in FIGS. 1 and 2, but the embodiment shown in FIGS. 3 and 4 tends to be less efficient, because the flaring of the static regain section 116 requires more primary air pressure to provide the same static pressure at the discharge opening 122.

In other embodiments, the induction assembly 100 may be constructed symmetrically about axis AX, such that the cross sectional envelope of the assembly 100 is circular rather than rectangular.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An apparatus for mixing a first gas at a first pressure with a second gas at a second pressure so as to produce a gas mixture, and discharging said gas mixture against a third pressure, comprising:

A. a primary intake plenum for receiving and directing said first gas to a primary throat aperture, which accelerates primary gas to a first velocity and channels said primary gas along a first axis into a momentum transfer section;

B. a secondary intake plenum for receiving and directing a second gas toward said momentum transfer section, wherein said primary gas at said first velocity in said momentum transfer section creates a negative pressure region in said momentum transfer section, thus inducing said second gas into said momentum transfer section with said primary gas, thus forming a gas mixture, said mixture flows along said first axis and away from said primary throat aperture;

C. a static regain section having a first end, a second end, a first interior surface disposed along and at a first regain angle to said first axis, and a second interior surface disposed along and at a second regain angle to said first axis, said momentum transfer section being fixedly attached to said first end of said static regain section and providing said gas mixture to said static regain section along said first axis, away from said primary throat aperture and toward a discharge opening disposed at said second end of said static regain section, wherein a velocity pressure of said gas mixture is converted to a static pressure as said gas mixture flows along said first axis within said static regain section and toward said discharge opening.

2. An apparatus according to claim 1, wherein said first gas includes air from an air handling unit and said second gas includes air from fresh air reservoir.

3. An apparatus according to claim 1, wherein said secondary intake plenum directs said second gas toward said momentum transfer section in a direction substantially normal to said first axis.

4. An apparatus according to claim 1, wherein a flow rate of said second gas induced into said momentum transfer section is substantially equal to a flow rate of said first gas channeled into said momentum transfer section.

5. An apparatus according to claim 1, wherein said first regain angle is substantially equal to said second regain angle.

6. An apparatus according to claim 5, wherein said first regain angle is substantially equal to 4 degrees.

7. An apparatus according to claim 5, wherein said first regain angle is greater than or equal to 2 degrees and less than or equal to 7 degrees.

8. An apparatus according to claim 1, wherein said secondary intake plenum includes secondary filters such that said second gas passes through said secondary filters prior to mixing with said primary gas in said momentum transfer section.

9. An apparatus according to claim 1, said discharge opening being fixedly attached to a discharge plenum having an output filter and a flow splitter, wherein said flow splitter distributes said gas mixture across said output filter in a substantially uniform distribution and said gas mixture passes through said output filter.

10. An apparatus according to claim 1, wherein said first gas flows at a flow rate of greater than 300 c.f.m. and less than or equal to 360 c.f.m. and at approximately 1.4 in. w.g., said second gas flows at a flow rate of greater than 300 c.f.m. and less than or equal to 360 c.f.m., said negative pressure region is approximately −0.1in. w.g., and said gas mixture flows through said discharge opening at a flow rate substantially equal to the sum of said first gas flow rate and said second gas flow rate.

11. An apparatus according to claim 1, wherein said primary throat aperture is defined by a gap of approximately 0.178 inches in a direction substantially normal to said first axis, said momentum transfer section is defined by a gap of approximately 0.54 inches in a direction substantially normal to said first axis, and a distance from said primary throat aperture to said discharge opening is approximately 16 inches.

12. An apparatus accepting primary air from an air handling unit, drawing by induction a comparable amount of secondary air from the return plenum in which the device resides, and delivering the total to an integral high efficiency filter at the required flow volume and pressure, comprising:

A. a primary air intake plenum, delivering uniform primary air to a primary air throat aperture, said primary air throat aperture accelerating said primary air to a high velocity so as to induce said comparable amount of secondary air;

B. a secondary air guide, bringing said secondary air into smooth convergence with said primary air;

C. a momentum transfer section, bringing said primary and secondary air into momentum balance;

D. a static regain section, receiving said primary and secondary air from said momentum transfer section and converting, in accordance with Bernoulli equation, velocity pressure into static pressure; and, E. a discharge opening, receiving said primary and said secondary air from said static regain section.

* * * * *